(12) United States Patent
Ferren et al.

(10) Patent No.: US 6,818,904 B1
(45) Date of Patent: Nov. 16, 2004

(54) ULTRAVIOLET RADIATION EXPOSURE SENSOR

(75) Inventors: Bran Ferren, Beverly Hills, CA (US); W. Daniel Hillis, Toluca Lake, CA (US)

(73) Assignee: Applied Minds, Inc., Glendale, CA (US)

( * ) Notice: Subject to any disclaimer, the term of this patent is extended or adjusted under 35 U.S.C. 154(b) by 338 days.

(21) Appl. No.: 09/995,270

(22) Filed: Nov. 27, 2001

Related U.S. Application Data

(60) Provisional application No. 60/250,955, filed on Nov. 29, 2000.

(51) Int. Cl.[7] .............................. G01T 1/04; G01T 1/06; G01T 5/00; G03G 5/10
(52) U.S. Cl. ................................ 250/472.1; 250/474.1; 250/461.1
(58) Field of Search ........................... 250/472.1, 474.1, 250/461.1, 372

(56) References Cited

U.S. PATENT DOCUMENTS

| | | | | |
|---|---|---|---|---|
| 4,829,187 A | * | 5/1989 | Tomita et al. ............ | 250/474.1 |
| 5,117,116 A | * | 5/1992 | Bannard et al. ......... | 250/474.1 |
| 5,986,273 A | * | 11/1999 | Tripp et al. .............. | 250/474.1 |
| 6,060,321 A | * | 5/2000 | Hovorka .................. | 436/57 |
| 6,130,435 A | * | 10/2000 | Rocklin ................... | 250/474.1 |
| 6,132,681 A | * | 10/2000 | Faran et al. ............. | 422/58 |
| 6,504,161 B1 | * | 1/2003 | Jackson et al. ......... | 250/474.1 |

OTHER PUBLICATIONS

*Stickers Monitor Sun Exposure*; Marshall's Brain: Howltuff-Works; http://www.howstuffworks.com/news–item182.htm.

* cited by examiner

*Primary Examiner*—David Porta
*Assistant Examiner*—Davienne Monbleau
(74) *Attorney, Agent, or Firm*—Glenn Patent Group; Michael A. Glenn

(57) ABSTRACT

An ultraviolet radiation sensor that indicates a predetermined cumulative exposure to ultraviolet radiation is disclosed. The presently preferred sensor comprises a membrane, a base, an ultraviolet degradable adhesive, and an indicating mechanism. The ultraviolet degradable adhesive adheres a portion of the membrane to the base, thereby maintaining the membrane in a biased state. The ultraviolet degradable adhesive fails when a predetermined cumulative exposure has been attained. Upon failure of the adhesive, the membrane reflexively restores itself to an unbiased state and activates the indicating mechanism. In a preferred embodiment of the invention, the sensor is worn by a user to indicate when the skin of the user has been exposed to excessive ultraviolet radiation.

21 Claims, 3 Drawing Sheets

ULTRAVIOLET RADIATION EXPOSURE SENSOR

RELATED APPLICATIONS

This application is related to U.S. Provisional Patent application Serial No. 60/250,955, filed Nov. 29, 2000.

BACKGROUND

1. Technical Field

This invention relates to ultraviolet radiation sensors. More particularly, the invention relates to sensors that indicate the level of exposure to ultraviolet radiation.

2. Description of the Prior Art

Exposure to ultraviolet radiation can cause a wide range of deleterious effects in human skin, including dehydration, burning, premature aging, and discoloration. In addition, it has been widely accepted and documented that excessive exposure to ultraviolet radiation can be carcinogenic in humans. Exposure to ultraviolet radiation is of particular concern for individuals who spend a significant amount of time exposed to the sun, and for those who are of fair complexion and are less tolerant to the sun's ultraviolet rays. In addition, damage to the earth's ozone layer and its ability to filter out ultraviolet radiation has further raised concern over the harmful effects that exposure to ultraviolet radiation may have.

For the above reasons, a variety of different devices and skin preparations have been developed to limit exposure to solar radiation. So called sunscreen clothing has been developed that filters or blocks ultraviolet radiation. In addition, significant advances have been made in the development and commercialization of topical sunscreen preparations that may be applied to the skin to provide protection from ultraviolet rays Several such prior art sensors use ultraviolet sensitive inks that change color with increased exposure to ultraviolet rays. The problem with such sensors is that they are purely visual. Many users wear the sensors while engaging in strenuous or fast-paced activities, where little attention is given to the sensor. Thus, a change in color of the sensor often goes unnoticed.

Furthermore, such sensors typically exhibit a gradual change in color as exposure to ultraviolet light is increased. It may therefore be unclear to the user exactly what shade of color corresponds to an unacceptably high level of exposure.

Finally, most ultraviolet radiation sensors are calibrated to indicate the amount of radiation absorbed by untreated skin. If suntan lotion is applied to the skin, the masking effects of the lotion are not reflected in the exposure indicated by the sensor.

What is needed is an ultraviolet radiation sensor that produces not only visual cues indicating excessive exposure, but audible and tactile signals as well. The sensor should also provide a discrete, unambiguous indication of excessive exposure. Lastly, the exposure measured by the sensor should reflect the masking effects of any suntan lotion that may be applied.

SUMMARY

An ultraviolet radiation sensor is disclosed that indicates a predetermined cumulative exposure to ultraviolet radiation. The presently preferred sensor comprises a membrane, a base, an ultraviolet degradable adhesive, and an indicating mechanism. The ultraviolet degradable adhesive adheres a portion of the membrane to the base, thereby maintaining the membrane in a biased state. The ultraviolet degradable adhesive fails when a predetermined cumulative exposure has been attained. Upon failure of the adhesive, the membrane reflexively restores itself to an unbiased state and activates the indicating mechanism.

In a preferred embodiment of the invention, the sensor worn by a user to indicate when the skin of the user has been exposed to excessive ultraviolet radiation. In other, equally preferred embodiments of the invention, the membrane produces a sound that is audible to the user when the membrane returns to an unbiased state. The membrane may also produce a tactile sensation that is detectable by the user when the membrane returns to an unbiased state. Additionally, when in an unbiased state, the membrane may possess a tactilely sensible feature for verifying that the membrane has returned to the unbiased state. Various color indicating mechanisms may also be used to advise the user that excessive exposure has been attained.

The sensor may also receive suntan lotion. The extent of lotion absorption and excreation by the membrane are preferably similar to those of the human skin. Thus, the proper degree of ultraviolet exposure is indicated even if suntan lotion is applied by the user.

DESCRIPTION

Figure 1:
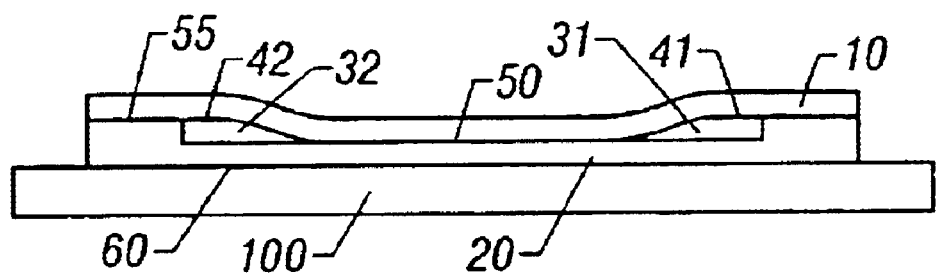
FIG. 1 shows a cross-sectional view of an ultraviolet radiation exposure sensor according to the preferred embodiment of the invention, with a upper membrane in a biased state.

FIG. 1 shows a cross-sectional view of an ultraviolet radiation exposure sensor according to the preferred embodiment of the invention, with an upper membrane in a biased state. The sensor is comprised generally of a transparent semi-permeable membrane 10, and a base 20, releasably adhered to the skin 100 of the user with a releasable adhesive 60. The semi-permeable membrane is generally a thin, flexible membrane having an upper surface and a lower surface. An ultraviolet degradable adhesive (UDA) 50 maintains the semi-permeable membrane in a resiliently biased state adhering, along a degradable adhesive interface, a portion of the lower surface of the membrane to the base of the sensor. Away from the adhesive interface, the membrane is also adhered to the base using a non-degradable adhesive 55. In this biased state of the sensor, the adhesive interface separates two color indicators 31 and 32 contained within cells 41 and 42.

Figure 2A:
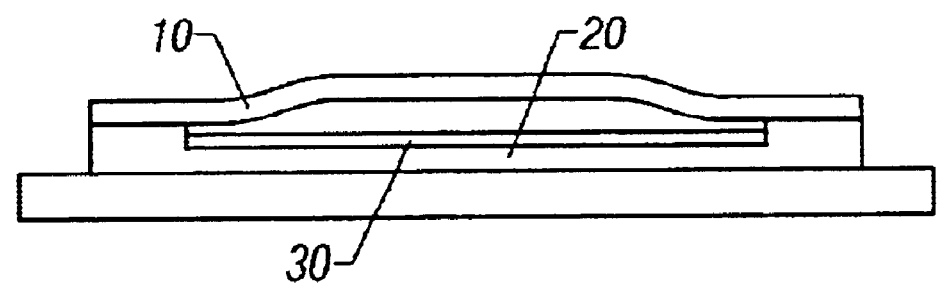
FIGS. 2a and 2b show cross-sectional views of an ultraviolet radiation exposure sensor according to the preferred embodiment of the invention, with the upper membrane in an unbiased state.
Figure 2B:
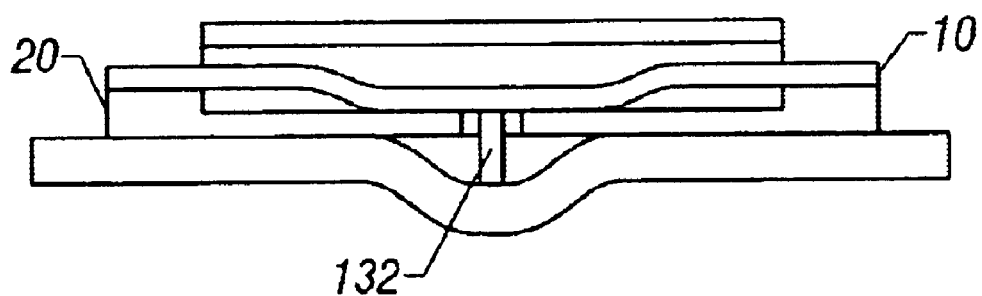

FIGS. 2a and 2b show cross-sectional views of an ultraviolet radiation exposure, sensor according to the preferred embodiment of the invention, with the upper membrane in an unbiased state. Once an excessive cumulative level of exposure to ultraviolet radiation is attained, the ultraviolet degradable adhesive fails, releasing the semi-permeable membrane 10 from contact with the base 20, allowing the membrane to restore itself reflexively to the unbiased state shown in FIG. 2a. As the membrane returns to an unbiased state, the two color indicators 31 and 32 are allowed to mix with one another to produce a third color indicator 30, yielding a color change detectable by the user. Preferably, the two color indicators are liquids that are initially colorless, but produce a colored liquid upon mixing. Alternatively, the two color indicators may initially be of different color, producing a third color upon mixing. Further, the indication of ultraviolet exposure may be provided by patterned layers that, when combined upon the membrane's return to an unbiased state, may form a message, e.g. maximum safe exposure or may form a warning indicia, e.g. a skull and cross bones.

The restorative action of the membrane is preferably both rapid and vigorous. The action therefore creates a tactile sensation detectable by the user, for example, by positioning a small, biased protuberance adjacent to the user's skin. In this later case, the unbiased state (FIG. 2b) projects downwardly, forcing the protuberance 132 into contact with the user's skin. Further embodiments of the invention may provide both visible and tactile indications simultaneously.

After failure of the adhesive, the membrane maintains a depressible feel, thereby allowing the user to verify the indication of excessive exposure. Preferably, the sensor also emits a sound such as a click or pop, audible to the user, upon returning to the unbiased state, for example, this can be accomplished by forming the biased membrane from a semi-rigid material that snaps when flexed, e.g. when returning to an unbiased position. The sensor thus provides an affirmative indication of excessive ultraviolet radiation exposure. Furthermore, unlike many prior art approaches, the indication is discrete and unambiguous, in that the membrane at once returns from a biased to an unbiased state. The invention thus requires no interpretation of the sensor by the user to determine that an excessive level of exposure has been attained.

Several commercially available adhesives are suitable for use as the ultraviolet degradable adhesive 50. For example, the adhesives found in 3M product numbers 7914 and 7910 are known to degrade relatively rapidly in the presence of ultraviolet radiation. Other adhesives may be selected depending on the rate and nature of adhesive degradation desired for a particular application. In particular, a more rapidly degrading adhesive may be used in sensors designed to indicate excessive exposure at lower cumulative exposures. These sensors may be used by those with skin comparatively more sensitive to ultraviolet radiation. Correspondingly, a more slowly degrading adhesive may be used in sensors with a higher excessive exposure threshold, for use by those users with comparatively less sensitive skin. It may also be possible to achieve a similar variation in the exposure threshold of the sensor by varying the amount of adhesive used to adhere the membrane to the base.

Because one of the primary applications of the invention is for use on the skin of the user, in the preferred embodiment, the semi-permeable membrane 10 and base 20 are constructed of materials closely approximating the characteristics of human skin.

Specifically, the materials allow for the migration of water vapor, and atmospheric gases through the membrane while preventing the transmission of water in a liquid form. Consequently, when the sensor is applied to human skin, the skin is allowed to breathe such that perspiration and carbon dioxide migrate from the skin through sensor and into the atmosphere. At the same time, liquid water is prevented from penetrating the membrane, therefore reducing the likelihood of the bond between the removable adhesive 60 and the skin being disrupted.

In addition, the membrane 10 and base 20 should have the further characteristics of being non-toxic, hypoalelergenic, and resistant to the effects of ultraviolet radiation. It will be appreciated that a wide variety of different materials, including polymers, may be suitable for formation of the base and membrane. A number of such membranes have been developed for use as artificial skin and are currently in use in the medical profession to treat burn victims and those requiring skin grafts. An example of a commercially available product that has been found to perform adequately as semi-permeable membrane is a product sold under the trademark TEGADERM by the 3M Company.

Because the removable adhesive must be capable of adhering the sensor to the skin, it also should be non-toxic and hypoallergenic, and should allow for the passage of water vapor and other gases there through. In addition, the removable adhesive 60 should allow for simple and easy removal of the sensor from the skin without significant damage to the upper epidermal layer. Suitable adhesives are well known in the prior art, including those used for conventional adhesive bandages and transdermal medication patches.

In the preferred embodiment semi-permeable membrane 10 also absorbs topical solutions, such as sunscreen and suntan preparations, in a manner similar to that of human skin. The application of a topical sunscreen preparation on both the skin of the user and the surface of the sensor, so that the sunscreen is received and absorbed into the membrane, therefore equally lessens the exposure of both the skin and the UDA to ultraviolet radiation. Furthermore, the effectiveness of the sunscreen in lessening the exposure of the UDA to ultraviolet radiation decreases over time, e.g. through physical activity, perspiration, and general degradation by solar radiation, in a manner similar to that of human skin. Thus, even as the effectiveness of the sunscreen applied to the skin of a user is lessened, the exposure received by the UDA, and thus indicated by the sensor, remains commensurate with that received by the skin of the user.

Figure 3A:
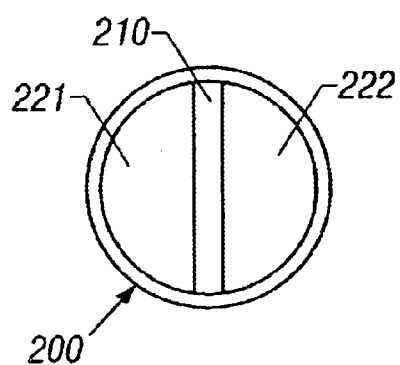
FIGS. 3a, 3b, and 3c show plan views of alternative configurations of the ultraviolet degradable adhesive according to the invention.
Figure 3B:
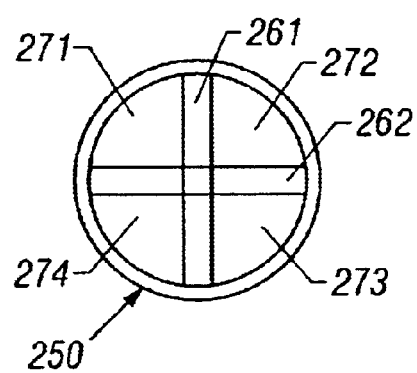
Figure 3C:
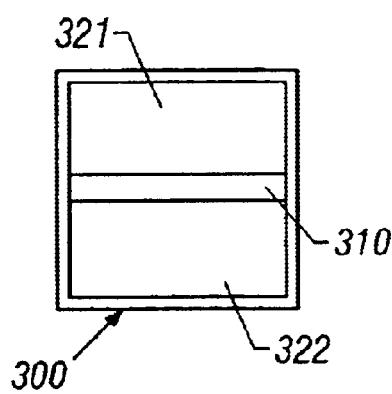
Figure 4A:
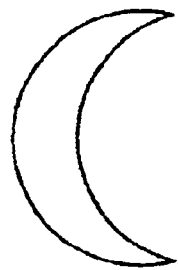
FIGS. 4a–4g show plan views of alternative shapes of the ultraviolet radiation exposure sensor according to the invention.
Figure 4B:
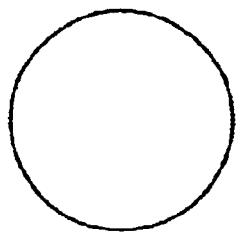
Figure 4C:
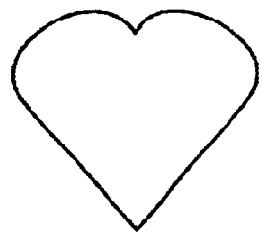
Figure 4D:
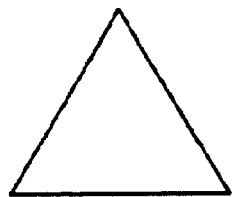
Figure 4E:
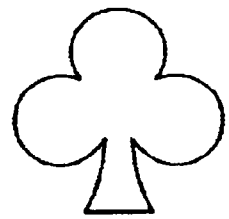
Figure 4F:
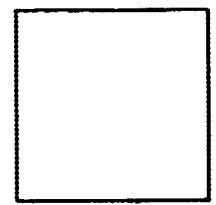
Figure 4G:
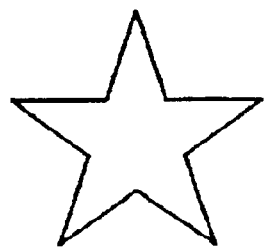

FIGS. 3a–3c show plan views of alternative configurations of the ultraviolet degradable adhesive according to the invention. The ultraviolet degradable adhesive shown in FIGS. 1 and 2 may be used to construct sensors of a wide variety of configurations. One embodiment provides a circular, two cell configuration 200 (FIG. 3a) in which the top membrane is adhered to the base along a single essentially linear interface 210, separating the cavity between the membrane and the base into two cells 221 and 222. Similarly, a circular, four cell configuration 250 (FIG. 3b) can be achieved by adhering the membrane to the base along two intersecting interfaces 261 and 262, creating four cells 271, 272, 273, and 274. In general, any number of cells may be realized in a similar manner. Furthermore, the sensor may be of a shape other than a circle, as in the case of a square, two cell configuration 300 (FIG. 3c). Once again, a linear adhesive interface 310 creates two cells 321 and 322. Finally, the interface along which the membrane and base are adhered to one another need not be linear, allowing for a greater variety of cell shapes. In combination with any number of color indicators, a great number of patterns, shapes, and designs are attainable.

FIGS. 4a–4g show plan views of alternative shapes of the ultraviolet radiation exposure sensor according to the invention, These shapes may be constructed to be appealing to certain ages or types of users, such as children or athletes. Those skilled in the art will appreciate that other shapes may be provided in accordance with the invention.

Figure 5:
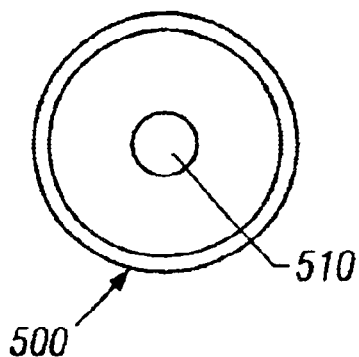
FIG. 5 shows a plan view of a sensor according to the invention incorporating a color indicating mechanism that is based on diffractive behavior.

FIG. 5 shows a plan view of a sensor according to the invention incorporating a color indicating mechanism based on diffractive behavior. In this circular configuration 500 a circular membrane is adhered to a base at a circular adhesive interface 510 substantially smaller than and centered within the membrane. In a biased state the membrane transmits all wavelengths of light, resulting in a clear appearance. However, the membrane is designed such that in an unbiased state, it diffracts selected wavelengths of light. This provides a color change in the membrane when the adhesive fails. In a similar manner, the membrane can be designed to display a single color, or more complicated designs incorporating several colors. Alternatively, it may display patterns that, when combined, provide a message or iconic indication to the user of the sensor.

In yet another embodiment of the invention, a colored dye, contained within the degradable adhesive 50, is released into a cell between the base and membrane upon failure of the adhesive. There, it may mix with an initially colorless liquid to yield a uniform color throughout the cell.

Other embodiments of the invention may incorporate multiple sensors. Several identical sensors may be placed in various locations on the skin of the user, allowing for measurement of exposure at the different locations. Alternatively, sensors with adhesive designed to fail at different exposure thresholds may be incorporated, providing indication of an increasing exposure level. For convenience, the multiple sensors used in this embodiment may be incorporated onto a single unit or array of cells that is applied to the skin of the user. This functionality may also be realized by constructing a single sensor with multiple cells, each surrounded by adhesive designed to fail at a different level of exposure. As the cumulative exposure to ultraviolet light increases, successive cells of color indicator are released, indicating the level of exposure. Linear and concentric configurations of cells, among others, may be created in this manner.

Finally, as an alternative to the ultraviolet degradable adhesive, an ultraviolet degradable film is incorporated into the sensor. Such a film is bonded between the membrane and base with conventional adhesives in a laminate construction. Excessive exposure to ultraviolet light leads to degradation of the film and therefore failure of the laminate bond between the membrane and base.

It should be appreciated that the invention finds use in applications other than the protection of human skin from excessive exposure to ultraviolet radiation. The sensors described herein may find use in almost any other application where the cumulative exposure to ultraviolet radiation must be determined. The sensors may be used to protect fragile documents or artwork, for example. In other embodiments, the sensors may be used to indicate a requisite, rather than excessive, level of exposure, such as in curing and sterilization operations employing ultraviolet radiation. Further, the sensor may provide multiple cells which are sensitive to different wavelengths of light, thereby indicating an exposure spectrum.

Although the invention is described herein with reference to several embodiments, including the preferred embodiment, one skilled in the art will readily appreciate that other applications may be substituted for those set forth herein without departing from the spirit and scope of the invention.

Accordingly, the invention should only be limited by the following claims.

What is claimed is:

1. An apparatus for detecting cumulative exposure to ultraviolet radiation, comprising:
   at least one membrane having a curved configuration in its natural state and further having at least a first membrane surface;
   at least one base member having at least a first base member surface; and
   at least one degradable bonding means, bonding, along a degradable bonding interface, at least a portion of said first membrane surface to said first base member surface;
   wherein said degradable bonding means maintains said membrane In a biased state, said biased state created by inverting said curved configuration of said membrane and bonding it to said first base member surface;
   wherein said degradable bonding means fails upon attaining a predetermined cumulative exposure to ultraviolet radiation; and
   wherein upon failure of said degradable bonding means, said membrane reflexively restores itself to an unbiased state, to indicate said predetermined cumulative exposure to ultraviolet radiation.

2. The apparatus of claim 1, wherein said membrane, when in said unbiased state, comprises a tactilely sensible protuberance providing tactile verification that said membrane is In said unbiased state.

3. The apparatus of claim 1, wherein said membrane, upon reflexively restoring Itself to said unbiased state, produces an audible sound, providing verification that said membrane has restored itself to said unbiased state.

4. The apparatus of claim 1, wherein said degradable bonding means is a degradable adhesive possessing adhesive qualities degraded by continued exposure to ultraviolet radiation.

5. The apparatus of claim 1, wherein said apparatus, upon said membrane returning to said unbiased state, exhibits a color and/or pattern change providing verification that said membrane has restored itself to said unbiased state.

6. The apparatus of claim 5, wherein said color and/or pattern change is produced by a change In optical properties of said membrane upon returning to said unbiased state.

7. The apparatus of claim 5, further comprising:
   one or more color Indicators exhibiting said color change;
   wherein said membrane is a substantially optically transparent membrane; and
   wherein said color change is observed through said membrane.

8. The apparatus of claim 7, wherein said color indicators are colored dies.

9. The apparatus of claim 7, wherein said color indicators, before said failure of said degradable bonding means, are located within said degradable bonding means, and, upon said failure of said degradable bonding means, are released from within said degradable bonding means.

10. The apparatus of claim 7, wherein said color indicators are separated from one another by said degradable bonding interface, and
   wherein upon said failure of said bonding means, said color indicators are substantially mixed with one another, producing said color change.

11. The apparatus of claim 10, wherein said color indicators comprise indicators for a plurality of colors that, when at least one of said colors is substantially mixed with at least one other of said colors, produce at least a third color.

12. The apparatus of claim 10, wherein said color indicators comprise a plurality of substantially colorless indicators that, when at least one of said colorless indicators is mixed with at least one other of said colorless indicators, produce at least one substantially colored indicator.

13. The apparatus of claim 1, further comprising:
a removable adhesive for removably associating a second surface of said base member with a subject.

14. The apparatus of claim 13, wherein said removable adhesive adheres said second surface of said base member to a skin surface of a person.

15. The apparatus of claim 13, wherein said membrane, upon reflexively restoring itself to said unbiased state, produces vibrations tactilely sensible to said person, said vibrations providing verification that said membrane has restored itself to said unbiased state.

16. The apparatus of claim 14, wherein said membrane and said base allow diffusion of water vapor and atmospheric gases at rates substantially equal to those of said skin of said person.

17. The apparatus of claim 14, wherein said membrane and said base absorb and exude topical solutions to a degree substantially equal to that of said skin surface of said person.

18. The apparatus of claim 1, wherein said at least one membrane, said at least one base member, and said at least one degradable bonding means, are deployed at a plurality of locations.

19. The apparatus of claim 1, further comprising:
a plurality of said degradable bonding means that collectively fall over at a range of predetermined cumulative exposures to indicate increasing levels of ultraviolet exposure.

20. The apparatus of claim 19, wherein said plurality of degradable bonding means are provided within a single sensor array.

21. The apparatus of claim 1, wherein said biased state is any of biased toward a user's skin surface and biased away from a user's skin surface.

* * * * *